US011135914B2

(12) United States Patent
Glückler et al.

(10) Patent No.: US 11,135,914 B2
(45) Date of Patent: Oct. 5, 2021

(54) DRIVE AXLE FOR ELECTRIC VEHICLES

(71) Applicant: ZF Friedrichshafen AG, Friedrichshafen (DE)

(72) Inventors: Johannes Glückler, Friedrichshafen (DE); Stefan Renner, Bodman-Ludwigshafen (DE); Johannes Kaltenbach, Friedrichshafen (DE); Stefan Spühler, Markdorf (DE); Kai Bornträger, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/794,393

(22) Filed: Feb. 19, 2020

(65) Prior Publication Data

US 2020/0262293 A1 Aug. 20, 2020

(30) Foreign Application Priority Data

Feb. 19, 2019 (DE) ...................... 10 2019 202 207.3

(51) Int. Cl.
*B60K 17/04* (2006.01)
*F16H 37/04* (2006.01)
(Continued)

(52) U.S. Cl.
CPC .......... *B60K 17/046* (2013.01); *B60K 7/0007* (2013.01); *B60K 17/06* (2013.01);
(Continued)

(58) Field of Classification Search
CPC .... B60K 17/046; B60K 7/0007; B60K 17/06; B60K 17/08; B60K 1/02; F16H 37/046;
(Continued)

(56) References Cited

U.S. PATENT DOCUMENTS 8,640,801 B2 * 2/2014 Hennings ............. B60K 7/0007
180/65.6
10,384,524 B2 8/2019 Spiegel et al.
(Continued)

FOREIGN PATENT DOCUMENTS

DE 10 2008 032 848 A1 1/2010
DE 10 2009 002 437 A1 10/2010
(Continued)

OTHER PUBLICATIONS

German Search Report issued in corresponding German Patent Application No. 10 2019 202 207.3 dated Oct. 20, 2020.

*Primary Examiner* — Justin Holmes
(74) *Attorney, Agent, or Firm* — Finch & Maloney, PLLC; Michael J. Bujold; Jay S. Franklin

(57) ABSTRACT

A drive axle of an electrically drivable vehicle including first and second drive wheels (R1, R2), first and second manual transmissions (G1, G2) and first and second electrical machines (EM1, EM2) which each have a respective drive shaft (1a, 1b). The first electrical machine (EM1) drives the first drive wheel (R1), via the first manual transmission (G1), and the second electrical machine (EM2) drives the second drive wheel (R2), via the second manual transmission (G2). The manual transmissions are each designed as three-speed transmissions (G1, G2) which have identical transmission ratios (i1, i2, i3).

27 Claims, 6 Drawing Sheets

(51) Int. Cl.
*F16H 3/64* (2006.01)
*B60K 7/00* (2006.01)
*B60K 17/06* (2006.01)
*F16H 48/20* (2012.01)

(52) U.S. Cl.
CPC ............ *F16H 3/64* (2013.01); *F16H 37/046* (2013.01); *F16H 48/20* (2013.01); *B60Y 2200/91* (2013.01); *B60Y 2400/73* (2013.01); *F16H 2200/0039* (2013.01); *F16H 2200/201* (2013.01); *F16H 2200/2007* (2013.01); *F16H 2200/2035* (2013.01); *F16H 2702/02* (2013.01)

(58) Field of Classification Search
CPC .... F16H 3/64; F16H 48/20; F16H 2200/2035; F16H 2200/2007; F16H 2200/201; F16H 2702/02; F16H 2200/0039; F16H 2200/0021; F16H 2200/2038; F16H 2200/2097; F16H 2200/2064; F16H 2200/2094; F16H 3/66; F16H 48/36; B60Y 2200/91; B60Y 2400/73; B60B 35/125

See application file for complete search history.

(56) References Cited

U.S. PATENT DOCUMENTS

| | | | |
|---|---|---|---|
| 2012/0258831 A1* | 10/2012 | Knoblauch | ............ B60K 6/52 475/5 |
| 2014/0349801 A1 | 11/2014 | Brenner | |
| 2017/0204942 A1 | 7/2017 | Iuchi et al. | |
| 2019/0248247 A1* | 8/2019 | Yamaguchi | ............ B60K 17/26 |

FOREIGN PATENT DOCUMENTS

| | | | |
|---|---|---|---|
| DE | 10 2011 089 021 A1 | 6/2013 | |
| DE | 10 2011 121 819 A1 | 6/2013 | |
| DE | 102011121819 A1 * | 6/2013 | ................ B60L 7/00 |
| DE | 10 2012 110 269 A1 | 4/2014 | |
| WO | WO-2020082755 A1 * | 4/2020 | |

* cited by examiner

DRIVE AXLE FOR ELECTRIC VEHICLES

This application claims priority from German patent application serial no, 10 2019 202 207.3 filed Feb. 19, 2019.

FIELD OF THE INVENTION

The invention relates to a drive axe of an electrically drivable vehicle having two electric machines and manual transmissions downstream thereof and use of the manual transmissions of the electrically drivable vehicle.

BACKGROUND OF THE INVENTION

From DE 10 2009 002 437 A1 several variants of a purely electrically driven vehicle are known, wherein one variant according to FIG. 2 thereof has a purely electrically driven rear axle having single-wheel drives, i.e. a so-called individual-wheel drive. One electric machine having a manual transmission downstream thereof is assigned to every drive wheel, wherein both single-wheel drives are separated from each other. The manual transmissions are designed as two-speed transmissions and are shifted by means of a dog clutch, i.e. during shifting there is an interruption of traction torque. If, for instance, only the transmission on the right, which drives the right wheel, is shifted, a yawing moment occurs around the vertical axis of the vehicle as a result of the interruption of traction torque for the right wheel, which attempts to steer the vehicle to the right. To prevent such a yawing moment, gearshifts are performed simultaneously on both sides. On the other hand, a yawing moment may be desirable, e.g. when cornering, to improve the agility of the vehicle. In such a case, the yawing moment can be generated specifically by differing torque distributions to the right and to the left drive wheels (so-called torque-vectoring).

SUMMARY OF THE INVENTION

One problem addressed by the invention consists in arranging the drive components, i.e. the electrical machines and the transmission, in the area of the drive axle of an electrically drivable vehicle of the type mentioned above in a manner reducing the required space and weight.

The invention comprises the features of the independent claims. Advantageous embodiments will become apparent from the dependent claims.

According to a first aspect of the invention, the two manual transmissions (gearboxes), i.e. the manual transmission on the right and the manual transmission on the left, are each designed as a three-speed transmission, which can be used to achieve three gears, i.e. three different transmission ratios. The transmission ratios are used to reduce the speed of the electric machine to the speed of the drive wheel. This results in a higher torque at the drive wheel and a wider speed range for the vehicle. Both manual transmissions are identical, i.e. they each have the same transmission ratios and are arranged symmetrically to a central or symmetrical plane. The description below therefore mainly refers to one side only, as the other side is identical or a mirror image. The individual-wheel drive permits the function of torque vectoring.

According to a preferred embodiment, the first and second manual transmissions each comprise a first and a second shiftable planetary gearset, wherein both planetary gearsets are intercoupled, i.e. the first and second planetary gearsets form a linkage for shifting three gears or transmission ratios, respectively.

According to a further preferred embodiment, each planetary gearset is designed as an epicyclic gear having three shafts, namely a carrier shaft, a ring gear shaft and a sun shaft. Alternatively, the terms carrier or planet carrier, ring gear or sun gear are also used, which each have the same kinematic function.

According to a further preferred embodiment, the carrier shaft of the first planetary gearset is coupled to the ring gear shaft of the second planetary gearset. This coupling kinematically interconnects both planetary gearsets.

According to a further preferred embodiment, the sun shafts of the first planetary gearsets are each driven by an electric machine, i.e. the sun shafts are each firmly connected to the drive shafts of the electric machines, below also referred to as E-machines.

According to a further preferred embodiment, the sun shaft of the second planetary gearset is permanently immobilized, i.e. connected to the housing. This results in a defined transmission ratio of the second planetary gearset.

According to a further preferred embodiment, both manual transmissions, i.e. the right and the left one each have a shift device, also called shift element, having three shift positions, wherein the first shift position is provided for the first gear, the second shift position is provided for the second gear and the third shift position is provided for the third gear.

According to a further preferred embodiment, in the first shift position, i.e. in first gear, the ring gear shaft of the first planetary gearset is immobilized, preferably connected to the housing of the transmission by the shift device. In this way, a fixed speed ratio is established between the input and output of the linkage.

According to a further preferred embodiment, in the second shift position, i.e. for the second gear, the ring gear shaft of the first planetary gearset is coupled to the carrier shaft of the second planetary gearset. In this way, the second transmission ratio is determined for the second gear.

According to a further preferred embodiment, in the third shift position, i.e. for the third gear, the ring gear shaft of the first planetary gearset is coupled to the ring gear shaft of the second planetary gearset. In this way, the ring gear shaft of the first planetary gearset is also connected to the carrier shaft of the first planetary gearset, i.e. the ring gear shaft and carrier shaft are interlocked—the first planetary gearset is in direct drive.

According to a further preferred embodiment, the shift device is designed as an unsynchronized, positive-locking shift device, in particular as a dog clutch. The advantage of the dog clutch is the low manufacturing cost, but an interruption of traction torque occurs during shifting. However, the electrical machines can achieve synchronization during shifting:

When shifting on the left using the left electric machine, when shifting on the right using the right electric machine.

According to a further preferred embodiment, the carrier shaft of the second planetary gearset is designed as the output shaft of the manual transmission. This results in favorable efficiency of the linkage.

In another preferred embodiment, a constant transmission stage, which is located close to the wheel and can also be integrated into the drive wheel, is installed downstream of the manual transmission. The constant ratio stage permits a further reduction of the input speed, i.e. the speed of the electric machine, and an increase in torque or tractive force at the drive wheel, which is particularly advantageous for commercial vehicles because of their increased traction torque requirements.

According to a further preferred embodiment, the constant transmission stage is designed as a third planetary gearset, which has a sun shaft, a carrier shaft and a ring gear shaft attached to the housing. The carrier shaft of the second planetary gearset is used to drive the third planetary gearset via its sun shaft. The carrier shaft of the third planetary gearset, which forms the output shaft of the drive train between the electric machine and the drive wheel, provides the output.

According to a further preferred embodiment, an axle differential gear having a differential cage is arranged between the drive wheels, wherein the carrier shafts of the second planetary gearsets, i.e. of the right and left drive train, are firmly connected to the differential cage. Both drive trains are conjoined in the differential gear to establish a connection between the right and left drive train—then the drive is no longer an individual-wheel drive. One advantage of the differential gear is that when traction torque is interrupted during shifting on one side, the electric machine on the other side can support it, i.e. drive the differential gear, which then transmits the power equally to both drive wheels. In this way there is no interruption of traction torque.

According to a further preferred embodiment, the axle differential gear has a first and a second output shaft, which are designed as axle shafts for the right and left drive side.

According to a further preferred embodiment, a third planetary gearset is arranged between the differential gear and the drive wheels forming a constant transmission stage, i.e., a further gear down. In that case, the axle shafts are connected to the sun shafts of the third planetary gearsets and the carrier shafts are connected to the drive wheels. The ring gear is attached to the housing. The third planetary gearset can preferably be integrated into the drive wheel.

According to a further preferred embodiment, the electrical machines are arranged in the outer or near-wheel area with respect to the axial extension of the drive axle, while the second planetary gearsets are arranged in the central area, i.e., the second planetary gearsets, which are used to provide the output of the manual transmissions, are arranged in the immediate vicinity of the axle differential gear. In addition, the shift elements can also be arranged in the central area.

According to a further preferred embodiment, the shift devices, also called shift elements, are operated by actuators, wherein both actuators are arranged in a plane extending in parallel to the center plane between the two drive wheels. This has the advantage of reducing installation space in the axial direction.

According to a further preferred embodiment, the axle differential gear has a locking function, which can preferably be activated by means of another shift element. The differential gear can thus be locked as needed by actuating the shift element, wherein the differential cage is coupled to or locked with one of the differential gear output shafts or axle shafts. When the differential gear is locked, the drive wheel can no longer spin in case of different grip on either side.

According to a further preferred embodiment, the constant transmission stage is designed as a stationary gear, which preferably has an axle offset between input shaft and output shaft. The axle offset results in increased ground clearance of the vehicle. This axle configuration is also known as a portal axle.

According to a further preferred embodiment, a first variant of the stationary transmission is designed as a planetary gearset having a carrier and planetary gears, a sun gear and a ring gear, wherein the carrier is immobilized, i.e. the planetary gearset operates at a stationary transmission ratio. The drive is provided by one of the planetary gears, resulting in a power split. The ring gear provides the output via the drive gear.

According to a further preferred embodiment, a second variant of the stationary gear is designed as a spur gear unit having one input gear, two intermediate gears and one output gear, wherein the intermediate gears mesh with both the input gear and the output gear. As well, the two intermediate gears achieve a power split.

According to a further preferred embodiment, the electric machines have rotors, which are arranged coaxially with the axle shafts. The coaxial arrangement of the motor and gear components results in an extremely compact design.

According to a further preferred embodiment, the planetary gearsets, the axle differential gear and/or the shift elements are at least partially arranged inside the rotors, i.e. in the cavity formed by the rotors. This design considerably reduces installation space in the axial direction, because the planetary gearsets are not axially offset or only slightly offset from the rotors.

According to another aspect of the invention, the manual transmissions, which are designed as three-speed transmissions, can also be used as two-speed transmissions by deactivating or removing the third gear stage. This results in the advantage of the shiftable linkage, consisting of a first and second planetary gearset, being convertible from a three-speed transmission into a two-speed transmission with little effort. A further advantage is that relatively large stage increments between the two transmission ratios in the range of 1.5 to 2.0 can be implemented. Such stage increments can only be achieved by superimposing two planetary gearsets, wherein this stage increment range is particularly advantageous for the operation of the electric drive due to a very good utilization of the speed range.

BRIEF DESCRIPTION OF THE DRAWINGS

Exemplary embodiments of the invention are shown in the drawings and are described in more detail below, wherein further features and/or advantages may result from the description and/or the drawings. In the drawings

DETAILED DESCRIPTION OF THE PREFERRED EMBODIMENTS

Figure 1:
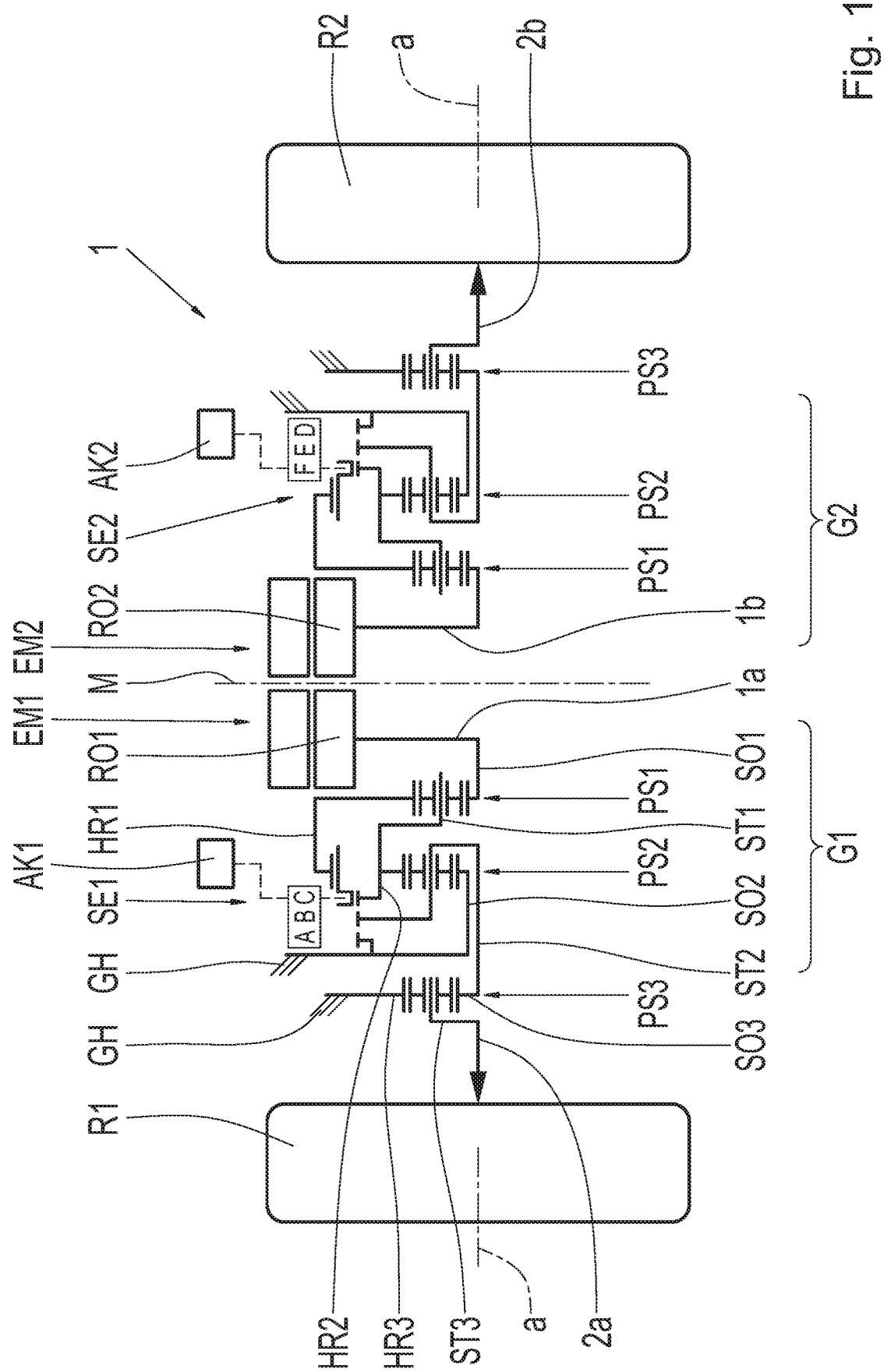
FIG. 1 shows a first exemplary embodiment of the invention for a first drive axle of an electric vehicle having a symmetrical transmission structure and an individual-wheel drive.

FIG. 1 shows a drive axle 1 (first drive axle) of an electrically drivable vehicle, hereinafter also referred to as electric vehicle for short, having two drive wheels R1, R2, which are driven by a first electric machine EM1 and a second electric machine EM2 as a first exemplary embodiment of the invention. The drive wheels R1, R2 and the electric machines EM1, EM2 are arranged coaxially with an axis of rotation a—the drawing only shows the half above the axis of rotation a, the lower half is a mirror image of the upper half. A first power flow between the first electric machine EM1 and the first drive wheel R1, hereinafter also referred to as wheel R1 for short, extends from an input shaft 1a, which is connected to the rotor RO1 of the electric machine EM1, to a first output shaft 2a, which is connected to the first wheel R1. Independently of the first power flow, a second power flow extends from the second input shaft 1b of a second rotor RO2 of the second electric machine EM2 to the second output shaft 2h, which is connected to the wheel R2. A first manual transmission comprising a first shiftable planetary gearset PS1 and a second shiftable planetary gearset PS2, and a constant transmission stage PS3, which is designed as a third planetary gearset PS3, are arranged between the input shaft 1a and the output shaft 2a. The same applies to the right side in the drawing, wherein the same designations PS1, PS2, PS3 are used for the three planetary gearsets. The planetary gearsets PS1, PS2, PS3 on the right side are mirror images of the planetary gearsets PS1, PS2, PS3 on the left side, i.e. they have the same gear ratios and kinematic structure. The first planetary gearset PS1 and the second planetary gearset PS2 are each designed as epicyclic gears having three shafts, namely carrier shafts ST1, ST2, sun shafts SO1, SO2 and ring gear shafts HR1, HR2. The first planetary gearset PS1 is coupled to the ring gear shaft HR2 of the second planetary gearset via the carrier shaft ST1 of the first planetary gearset PS1, thus both planetary gearsets PS1, PS2 form a linkage. The linkage has a shift device SE1 having three shift positions A, B, C, corresponding to three different coupling options. The shift device SE1 is controlled by an actuator AK1. Similarly, a second shift device SE2 having three mirror-image shift positions D, E, F and a second actuator AK2 for actuating the second shift element SE2 are provided for the right side.

The description below refers only to the left side, i.e. to the power flow from the first electric machine EM1 to the wheel R1. The description applies in a similar manner to the right side, i.e. to the power flow from the second electric machine EM2 to the second drive wheel R2. The first planetary gearset PS1 is driven by the drive shaft 1a via the sun shaft SO1. To achieve first gear, corresponding to the first shift position A, the ring gear shaft HR1 of the first planetary gearset is connected to the housing GH, i.e. immobilized. In this way, the first speed ratio between sun shaft SO1 and the carrier shaft ST1 is defined. The housing GH is represented by hatching (three parallel lines). The sun shaft SO2 of the second planetary gear PS2 is immobilized, i.e. permanently connected to the housing GH thus the speed ratio of the second planetary gear PS2 is also defined. The carrier shaft ST2 of the second planetary gearset PS2 provides the output into the third planetary gearset PS3, which is designed as a constant transmission stage and has a ring gear shaft HR3 attached to the housing and a sun shaft SO3 driven by the carrier shaft ST2. The carrier shaft ST3 provides the output to the output shaft 2a, which drives the left wheel R1.

To achieve second gear, the shift position B is controlled by the actuator AK1: in this way a coupling of the ring gear shaft HR1 of the first planetary gearset PS1 to the carrier shaft ST2 of the second planetary gearset PS2 is attained.

To achieve third gear, the shift position C is controlled by the actuator AK1, thus coupling the ring gear shaft HR1 of the first planetary gearset PS1 to the ring gear shaft HR2 of the second planetary gearset and to the carrier shaft ST1 of the first planetary gearset PS1. The ring gear shaft HR1 is thus interlocked with the carrier shaft ST1, such that the first planetary gearset PS1 revolves in the block.

In the neutral positions, i.e. between the shift positions A, B, C, the electric machine EM1 can be uncoupled, e.g. in so-called coasting mode, in which the electric vehicle rolls freely without losses caused by the co-rotating rotor of the electric machine EM1.

The shift devices SE1, SE2 are preferably designed as unsynchronized dog clutches, in which—as mentioned—an interruption of traction torque occurs. Synchronization during the shift process can, however, be performed by the electric machine. In principle, shift elements other than positive-locking ones can also be used, e.g. frictional clutches or brakes.

The rotors RO1, RO2 of the electric machines EM1, EM2 are designed to be hollow cylindrical and have an axis of rotation identical to that of the wheel axles a and of the output shafts 2a, 2b, i.e. the planetary gearsets PS1, PS2, PS3 are arranged coaxially with the rotors RO1, RO2. In the case of drive axle 1 shown in FIG. 1, the electric machines EM1, EM2 are arranged in the central area between the two drive wheels R1, R2, i.e. in the immediate area of the center plane and symmetry plane M. The three planetary gearsets PS1, PS2, PS3 are arranged one behind the other in the direction of the power flow, i.e. from inside to outside, on both the right and the left side.

Figure 2:
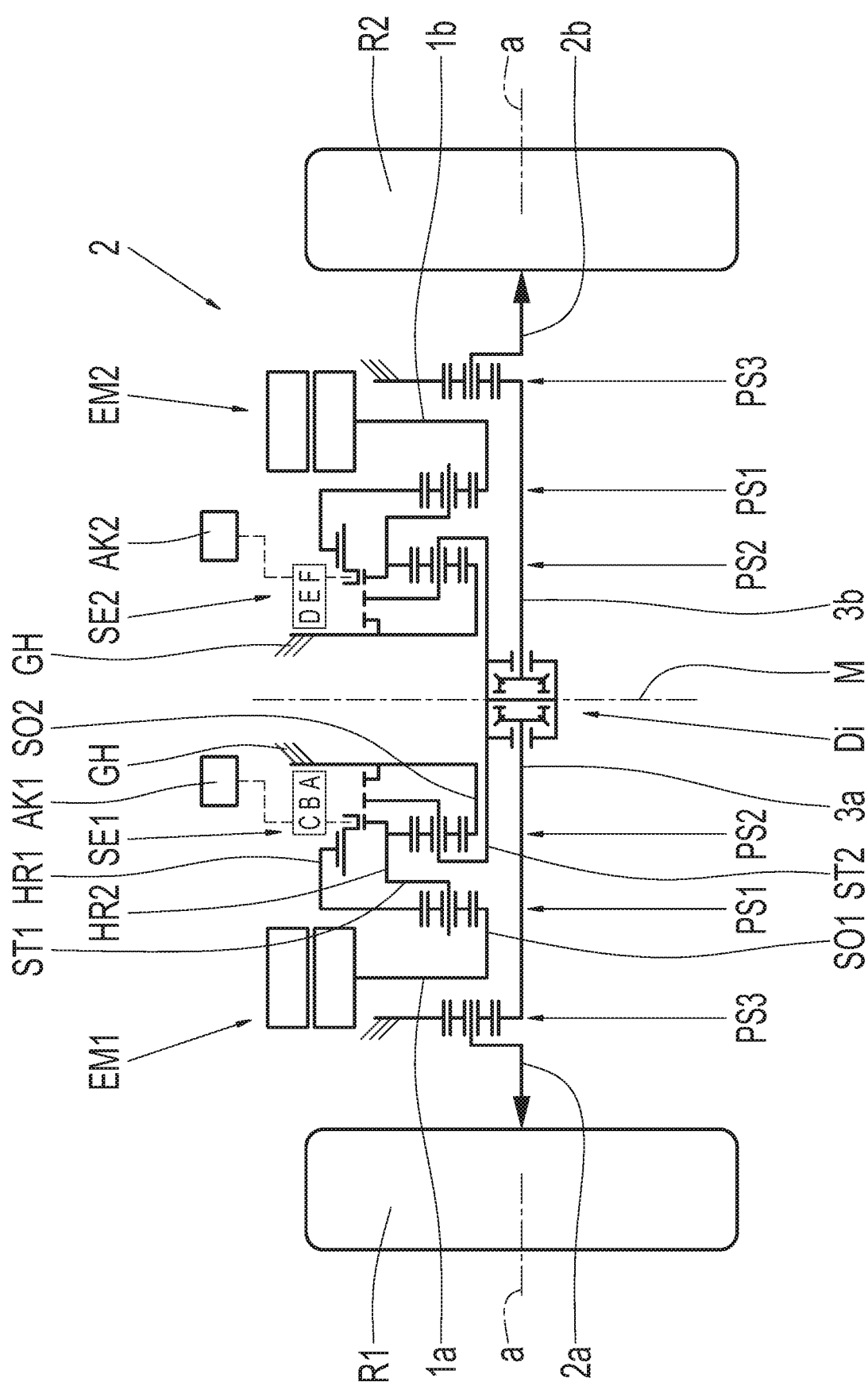
FIG. 2 shows a second exemplary embodiment of the invention for a second drive axle having an axle differential gear.

FIG. 2 shows a further exemplary embodiment of the invention for a drive axle 2 (second drive axle), wherein in FIG. 2 the same reference numerals are used for identical or similar parts. The drive axle 2 differs from the drive axle 1 on the one hand by a modified arrangement of the first and second planetary gearsets PS1, PS2 and the electric machines EM1, EM2 and on the other hand by the arrangement of a differential gear DI, which is designed as an axle differential gear or a transverse differential gear and is arranged between the two drive wheels R1, R2. The power flow from the two electric machines EM1, EM2, which are arranged on the outside if viewed in the axial direction, is effected via the first shiftable planetary gearset PS1 and then via the second shiftable planetary gearset PS2 into the differential gear DI, where the first power flow from the left side is combined with the second power flow from the right side. From the differential gear DI, the power is routed to the drive wheels R1, R2 via the axle shafts 3a, 3b and the third planetary gearset PS3, which is designed as a constant transmission stage, via the output shafts 2a, 2b. The actuators AK1, AK2 and the shift elements SE1, SE2 are arranged on the drive axle 2 in the area of the center plane M, i.e. between the two electric machines EM1, EM2. The design of the first and second planetary gearsets PS1, PS2 kinematically corresponds to the design according to FIG. 1, i.e. there is the same linkage.

The shift elements SE1, SE2, which each have three shift positions A, B, C and D, E, F for three gears, are preferably designed as unsynchronized dog clutches, wherein an interruption of traction torque occurs during shifting. Due to the arrangement of the differential gear DI, however, such an interruption of traction torque can be avoided by the second (right) electric machine EM2 supporting on the left side during the shift operation, e.g. during a changeover from shift position B to shift position A, i.e. during an interruption of traction torque on the left side, the second electric machine on the right side supplies power to the differential gear DI, which the differential gear DI delivers symmetrically to the two drive wheels R1, R2 via the two axle shafts 3a, 3b.

To achieve first gear, corresponding to shift position A, the ring gear shaft HR1 of the first planetary gearset PS1 is connected to the housing GH, i.e. immobilized. The sun shaft SO2 of the second planetary gearset PS2 is attached to the housing, resulting in fixed transmission ratios in the first and second planetary gearsets PS1, PS2, which, when connected in series, result in the transmission ratio ii of the first gear.

To achieve second gear, corresponding to shift position B, the carrier shaft ST1 of the first planetary gearset PS1 is coupled to the ring gear shaft HR1 of the first planetary gearset PS1. The power from the first electric machine EM1 is thus transmitted to the first planetary gearset PS1 via the drive shaft 1a and the sun shaft SO1 and from the first planetary gearset PS1 via its ring gear shaft HR1 and its carrier shaft ST1 into the second planetary gearset PS2, therefrom the output is transmitted to the differential gear DI, i.e. its differential cage (without reference numeral), via its carrier shaft ST2. The linkage then turns at the ratio $i_2$.

To achieve third gear, corresponding to shift position C, the ring gear shaft HR1 and the carrier shaft ST1 of the first planetary gearset PS1 are coupled, i.e. interlocked, i.e. the first planetary gearset PS1 is in direct drive. Simultaneously, the ring gear shaft HR2 of the second planetary gearset PS2 is connected to the ring gear shaft HR1 and the carrier shaft ST1. Again, the carrier shaft ST2 provides the output to the differential gear DI via the second planetary gearset PS2. The linkage then turns at the ratio $i_3$.

Obviously, the couplings of the individual transmission links for first, second and third gears are identical for the linkages of drive axle 1 and drive axle 2.

As mentioned above, the gears on the right side are shifted in the same way for the shift positions D, E, F. The shift elements SE1 SE2 are actuated by means of the actuators AK1, AK2. The planetary gearsets PS1, PS2, PS3 are arranged coaxially with the electric machines EM1, EM2, i.e. coaxially with the axis of rotation and the wheel axle a. In the drawing again only the upper half (above axis a) is shown; the lower half matches the upper half and is obtained by mirroring along the axis of rotation a.

Figure 3:
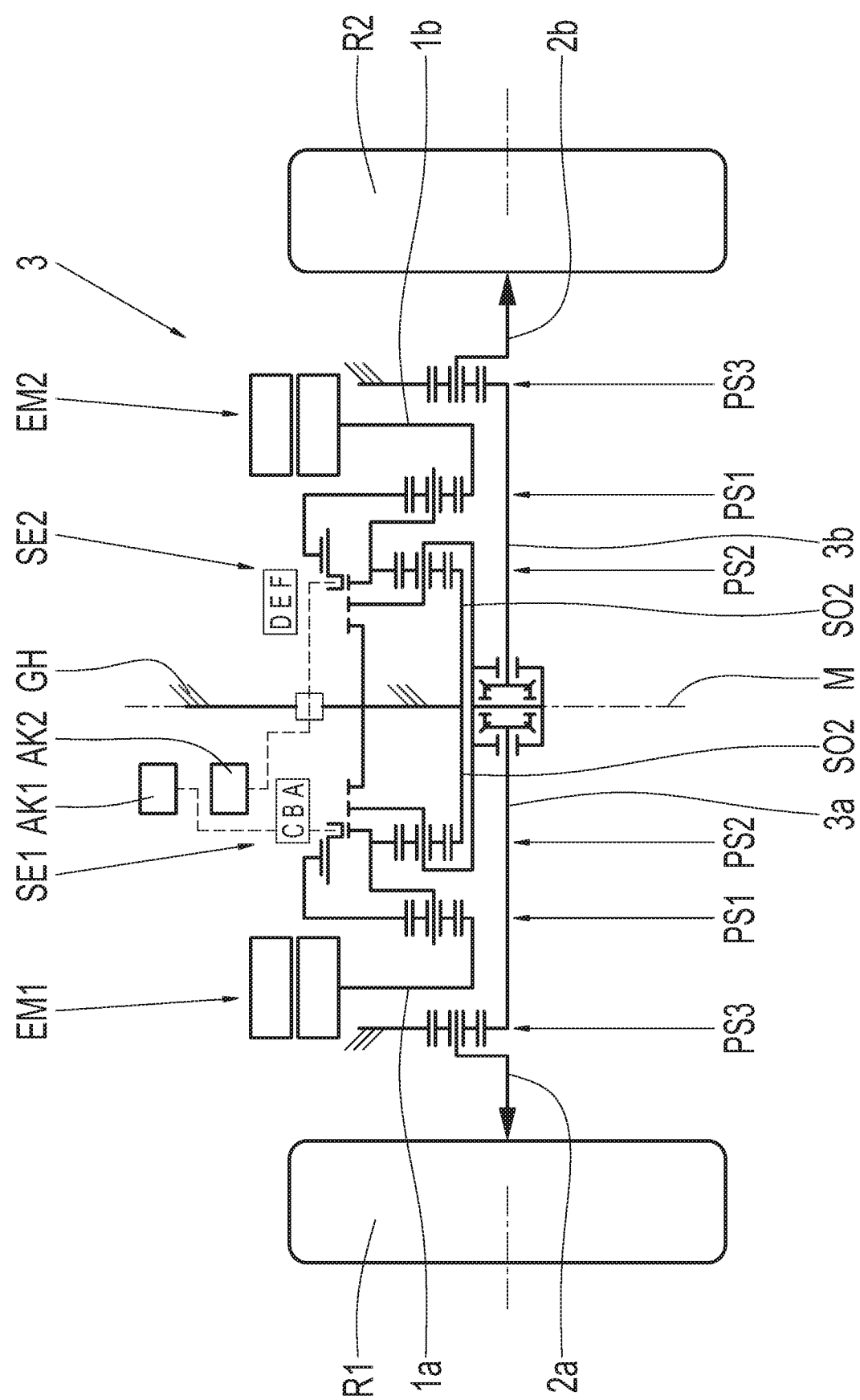
FIG. 3 shows a third exemplary embodiment of the invention for a third drive axle having centrally arranged actuators.

FIG. 3 shows a third exemplary embodiment of the invention for a drive axle 3 (third drive axle), which essentially matches the drive axle 2 according to FIG. 2. The same reference numerals are used for identical parts. The arrangement of the two actuators AK1 AK2, which trigger shifting in the two shift elements SE1, SE2, is different for drive axle 3. Both actuators AK1, AK2 are arranged in a common plane, which extends approximately in parallel to the center plane and symmetry plane M. This has the advantage of reduced installation space. A housing structure GH, for instance a housing wall GH, is arranged in the area of the center plane M, i.e. in the center between the two shift devices SE1, SE2. In the shift positions A and D, which are on the inside if viewed in the axial direction, the joint, centrally arranged housing structure GH can be used—likewise for the two immobilized sun shafts SO2 of the second planetary gearsets PS2. The connection (shown as a dotted line) between the second actuator AK2, which is located to the left of the center plane M, and the shift element SE2 on the right side runs through an opening in the housing structure GH.

Figure 4:
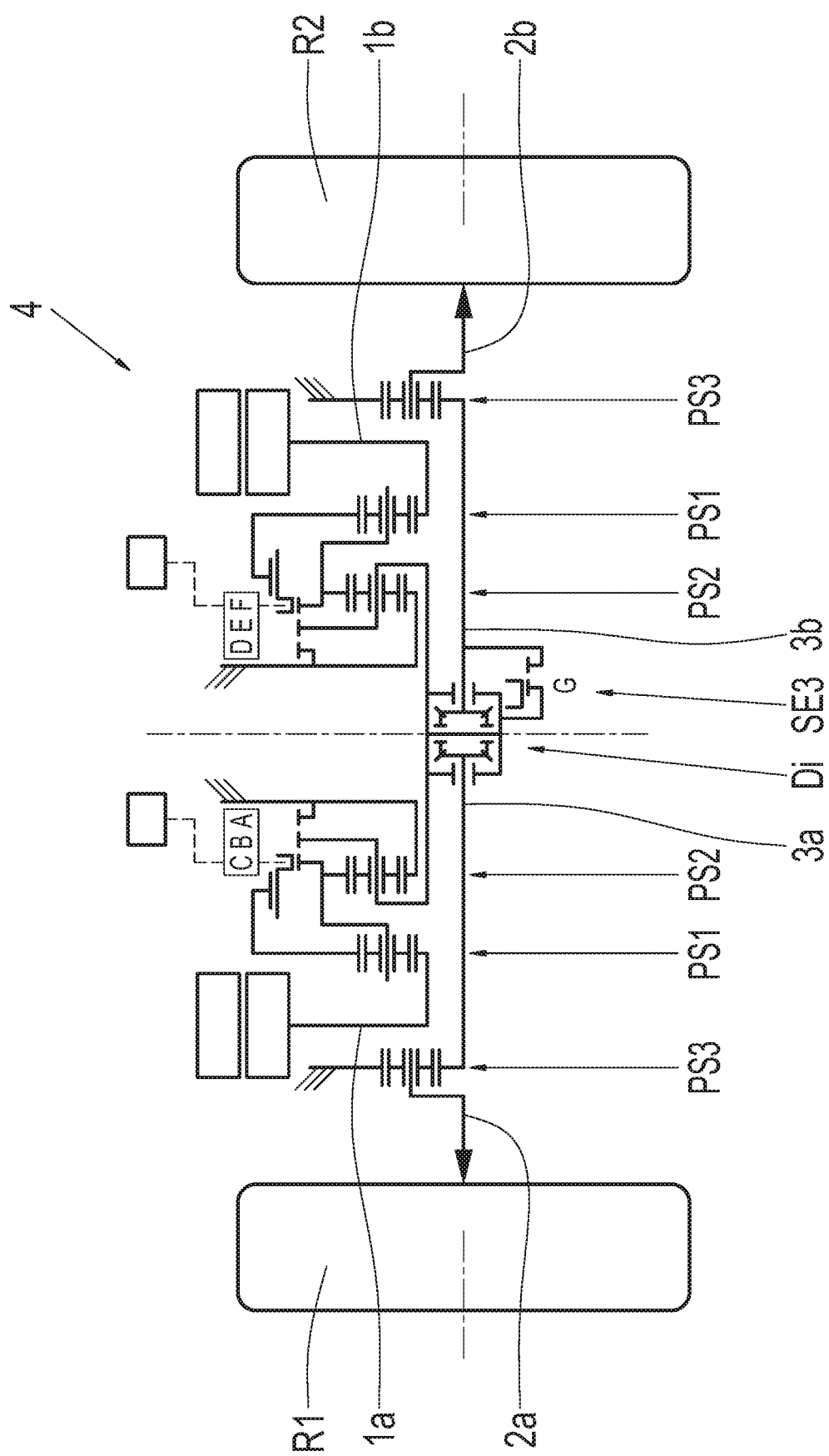
FIG. 4 shows a fourth exemplary embodiment of the invention for a fourth drive axle having an axle differential gear having a locking function.

FIG. 4 shows a fourth exemplary embodiment of the invention for a drive axle 4 (fourth drive axle), which essentially matches the drive axle 2 according to FIG. 2. The drive axle 4 is different in that the differential gear DI has a locking function for locking the differential and for unlocking (unlocking the lock), which locking function is performed by a shift element SE3. The shift element SE3 can be used to achieve a shift position G, in which the cage of the differential gear DI can be coupled, i.e. locked, to an axle shaft, in the drawing to the axle shaft 3b. When the differential gear DI is locked in the shift position G, there is no longer any speed compensation between the two drive wheels R1, R2, but rather there is a rigid connection between the two drive wheels R1, R2.

Figure 5:
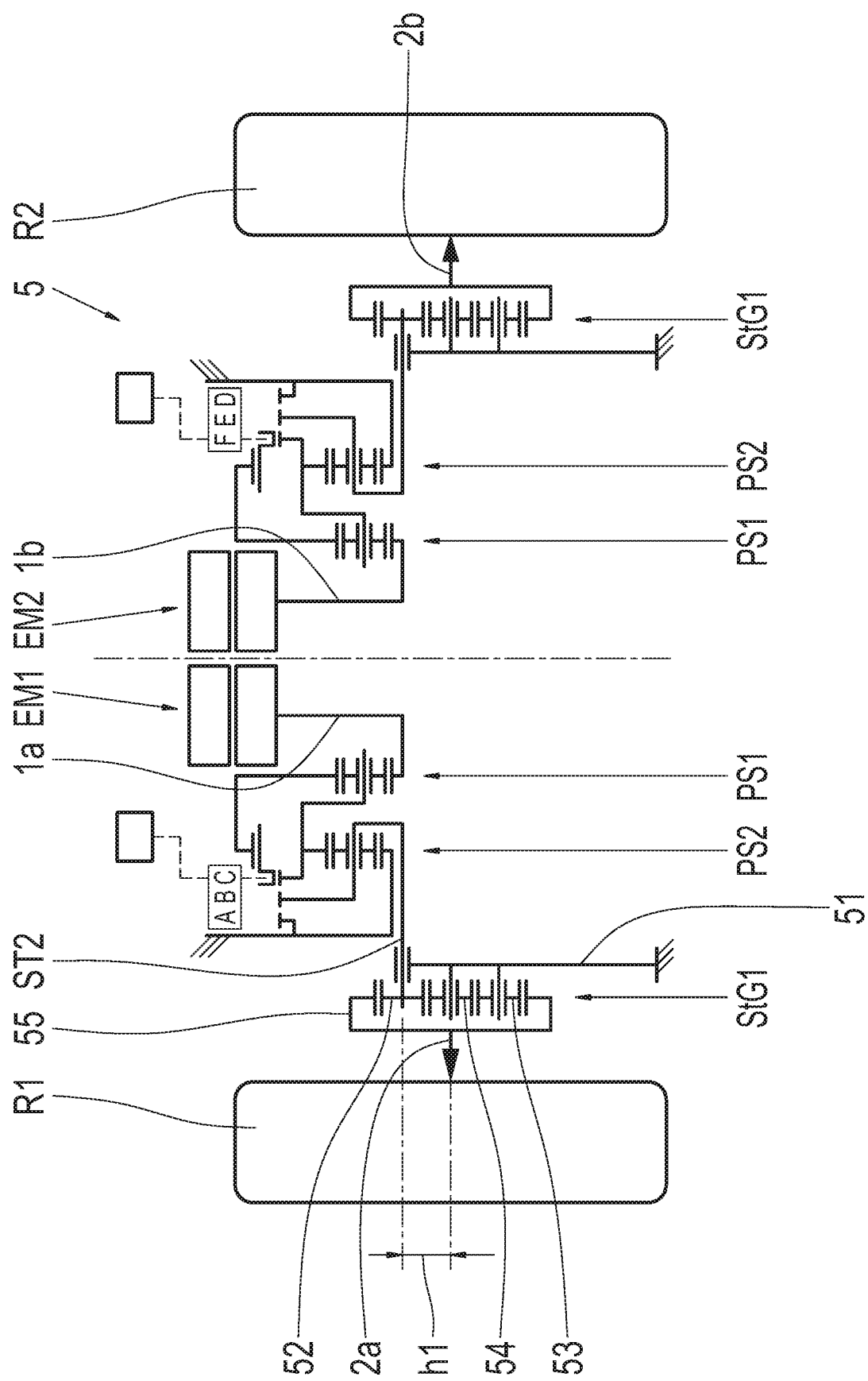
FIG. 5 shows a fifth exemplary embodiment of the invention for a fifth drive axle having stationary gears in the area close to the wheel (portal axle) and FIG. 6 shows a sixth exemplary embodiment of the invention for a sixth drive axle having alternative stationary gears (portal axle).

FIG. 5 shows a fifth exemplary embodiment of the invention (fifth drive axle), which matches the drive axle 1 according to FIG. 1 with respect to the arrangement of the electric machines EM1, EM2 and the shiftable planetary gearsets PS1, PS2. The difference is that the third planetary gearset PS3, which is designed as an epicyclic gear and is shown in FIG. 4 and forms a constant transmission stage, is replaced by a stationary transmission StG1 in FIG. 5, namely on both sides in the area of the drive wheels R1, R2. The stationary transmission StG1 is designed as a planetary gearset and has a carrier 51, planetary gears 52, 53, which are mounted opposite the carrier 51, a sun gear 54 and a ring gear 55. The carrier 51 is attached to the housing, i.e. the planetary gearset provides a stationary transmission ratio. The carrier shaft ST2 of the second planetary gearset PS2 provides the drive to the planetary gear 52. The ring gear 55 provides the output to the output shaft 2a and thus to the drive wheel R1. The stationary gear StG1 has an axle offset h1 between its input shaft ST2 and its output shaft 2a. This transmission arrangement having an axle offset is known as a so-called portal axle and has the advantage of greater ground clearance for the vehicle compared to the variants described above. Because of the drive via the planetary gear 52 and due to additional planetary gears on the circumference, the power flow from the input to the output is divided. The stationary transmission StG1 on the right side, which drives the right drive wheel R2, is a mirror image of the stationary transmission StG1 on the left side and shows the same gear down.

Figure 6:
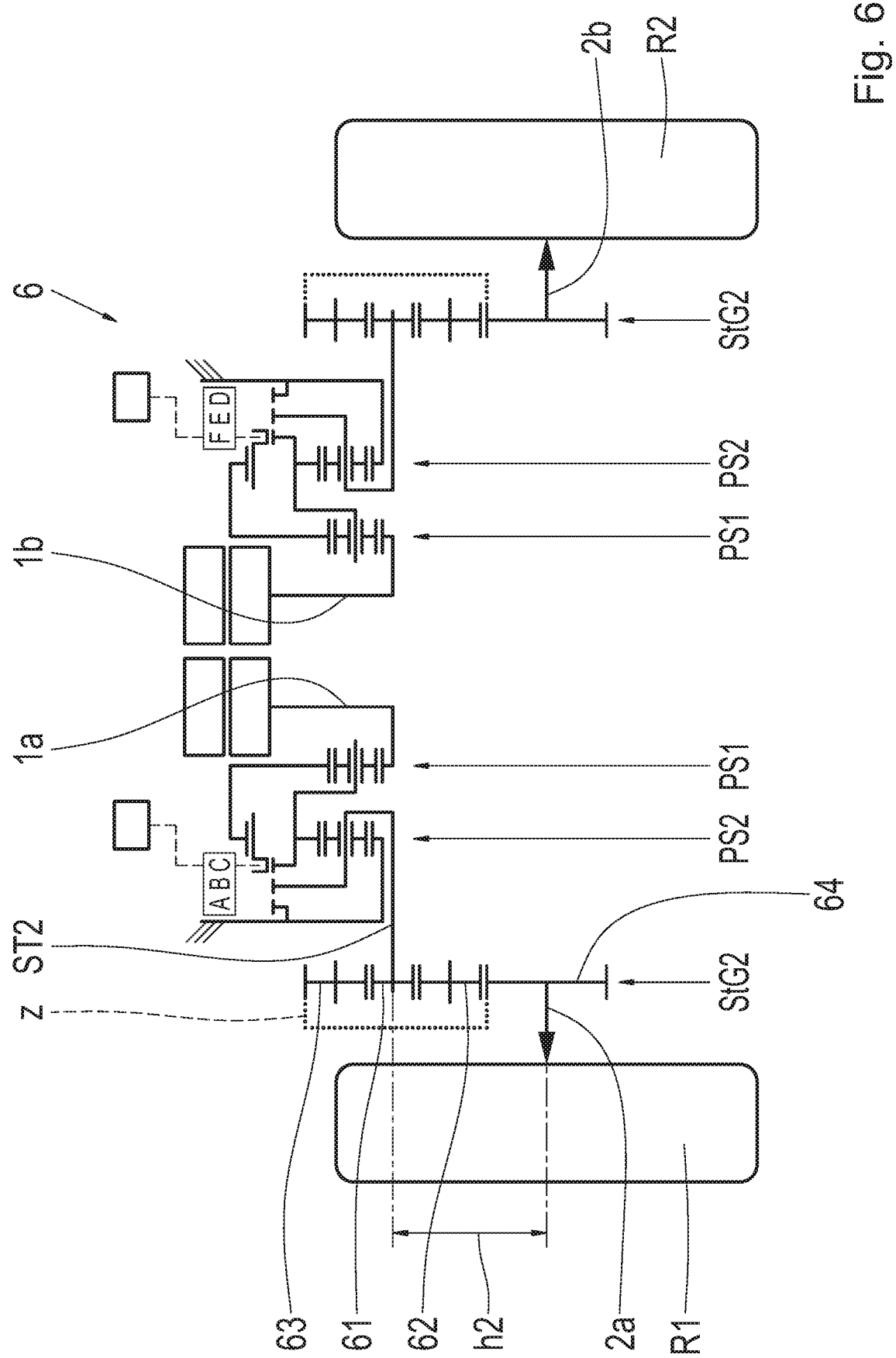

FIG. 6 shows a sixth exemplary embodiment of the invention for a drive axle 6 (sixth drive axle), which matches the drive axle 5 according to FIG. 5 with regard to the design and the arrangement of the electric machines EM1, EM2 and the first and second planetary gearsets PS1, PS2. The difference here is that a modified stationary transmission StG2 is used for the constant transmission stage in the area close to the wheel.

The stationary transmission StG2 is designed as a spur gear and has an input gear 61, driven by the carrier shaft ST2 of the second planetary gearset PS2, two intermediate gears 62, 63 and an output gear 64, which drives the wheel R1 via the output shaft 2a. There is an axle offset h2 between the input shaft of the stationary gear StG2, i.e. the carrier shaft ST2, and the output shaft 2b. The two intermediate gears 62, 63 are rotated into the drawing plane for reasons of illustration—they mesh with both the input gear 61 and the output gear 64. The centers of the gears 61, 62, 63, 64 form the tips of an imaginary rhombus, which is symbolically represented by a dotted line z (the centers of the gears and the rhombus formed thereof lie in a radial plane perpendicular to the drawing plane). The second stationary gear StG2 on the right side is a mirror image and has the same gear ratio.

With regard to the drive axles 1 to 6 described above in accordance with FIGS. 1 to 6, there is considerable potential for reducing installation space, in particular because the first and second planetary gearsets and possibly also the shift elements can be arranged at least partially within the rotors RO1, RO2 of the electrical machines EM1, EM2. The rotors RO1, RO2 have a hollow cylindrical design and, starting from the axis of rotation a, have a cylindrical cavity that can be used to accommodate the planetary gearsets. This reduces installation space in particular in the axial direction.

REFERENCE NUMERALS 1 first drive axle
1a drive, shaft (EM1)
1b drive shaft (EM2)
2 second drive axle
2a output shaft
2b output shaft
3 third drive axle
3a axle shaft
3b axle shaft
5 fifth drive axle
6 sixth drive shaft
51 Carrier (StG1)
52 planetary gear
53 planetary gear
54 sun gear
55 ring gear
61 drive gear (StG2)
62 first intermediate gear
63 second intermediate gear
64 output gear
a axis of rotation
AK1 first actuator
AK2 second actuator
A, B, C shift positions of SE1
D, E, F shift positions of SE2
EM1 first electric machine
EM2 second electric machine
DI differential gear
G shift position for blocking function
G1 first manual transmission
G2 second manual transmission
GH housing
h1 axle offset (StG1)
h2 axle offset (StG2)
HR1 ring gear shaft (PS1)
HR2 ring gear shaft (PS2)
HR3 ring gear shaft (PS3)
M center plane
R1 first (left) drive wheel
R2 second (right) drive wheel
RO1 first rotor (EM1)
RO2 second rotor (EM2)
SE1 first shift element
SE2 second shift element
SE3 third shift element
SO1 sun shaft (PS1)
SO2 sun shaft (PS2)
SO3 sun shaft (PS3)
ST1 carrier shaft (PS1)
ST2 carrier shaft (PS2)
ST3 carrier shaft (PS3)
StG1 first stationary transmission (first portal axle)
StG2 second stationary transmission (second portal axle)
z Auxiliary line (StG2)

The invention claimed is:

1. A drive axle of an electrically drivable vehicle, the drive axle comprising:
    first and second electric machines and each of the first and the second electric machines having a drive shaft,
    first and second drive wheels,
    first and second gearboxes,
    the first electrical machine driving the first drive wheel, via the first gearbox, and the second electrical machine driving the second drive wheel, via the second gearbox, and the first and the second gearboxes being designed as three-speed transmissions having identical transmission ratios, and
    the first and the second gearboxes each have a first shiftable planetary gearset and a second shiftable planetary gearset, and the first planetary gearset and the second planetary gearset are each intercoupled with one another.

2. The drive axle according to claim 1, wherein the first planetary gearsets and the second planetary gearsets are each tripartite, and each gearset has a carrier shaft, a ring gear shaft and a sun shaft.

3. The drive axle according to claim 2, wherein the carrier shaft of the first planetary gearset is coupled to the ring gear shaft of the second planetary gearset.

4. The drive axle according to claim 2, wherein the respective drive shafts of the first and the second electric machines are firmly connected to the respective sun shaft of the respective first planetary gearset.

5. The drive axle according to claim 2, wherein the sun shaft of the second planetary gearset is immobilized.

6. The drive axle according to claim 1, wherein the first and the second gearboxes each have a shift device having first, second and third shift positions for first, second and third gears, respectively.

7. The drive axle according to claim 6, wherein, in the first shift position, a ring gear shaft of the first planetary gearset is immobilized.

8. The drive axle according to claim 6, wherein, in the second shift position, a ring gear shaft of the first planetary gearset is coupled to a carrier shaft of the second planetary gearset.

9. The drive axle according to claim 6, wherein, in the third shift position, a ring gear shaft of the first planetary gearset is coupled to a ring gear shaft of the second planetary gearset or to a carrier shaft of the first planetary gearset.

10. The drive axle according to claim 6, wherein the shift devices are designed as unsynchronized, positive-locking shift devices.

11. The drive axle according to claim 2, wherein an output of the first gearbox and an output of the second gearbox are provided, in each case, via the carrier shaft of the second planetary gearset.

12. The drive axle according to claim 1, wherein a constant transmission stage is arranged in a region of the first and of the second drive wheel, respectively.

13. The drive axle according to claim 12, wherein the constant transmission stage is designed as a third planetary gearset which has a sun shaft, a carrier shaft and an immobilized ring gear shaft, a carrier shaft of the second planetary gearset is connected to the sun shaft of the third planetary gearset and the carrier shaft of the third planetary gearset is connected to the drive wheel.

14. A drive axle of an electrically drivable vehicle, the drive axle comprising:
first and second electric machines, and each of the first and the second electric machines having a drive shaft,
first and second drive wheels,
first and second gearboxes,
the first electrical machine driving the first drive wheel, via the first gearbox, and the second electrical machine driving the second drive wheel, via the second gearbox, and the first and the second gearboxes being designed as three-speed transmissions having identical transmission ratios, and
an axle differential gear, having a differential cage, is arranged between the first and the second drive wheels, and carrier shafts of second planetary gearsets are coupled to the differential cage.

15. The drive axle according to claim 14, wherein the axle differential gear has first and second output shafts, which are designed as axle shafts.

16. The drive axle according to claim 15, wherein a third planetary gearset is respectively arranged between the first and the second drive wheels and the axle differential gear, the first and the second output shafts of the axle differential gear are connected to sun shaft of the respective third planetary gearset and each the carrier shaft of the third planetary gearset is connected to the respective one of the first and the second drive wheels.

17. The drive axle according to claim 14, wherein the second planetary gearsets, viewed in a direction of the axle shafts, are arranged in a center area between the drive wheels and the electrical machines are arranged outside the center area.

18. The drive axle according to claim 14, wherein shift devices for the first and the second gearboxes are respectively actuatable by first and second actuators, and the first and second actuators are arranged in a common plane perpendicular to the axle shafts.

19. The drive axle according to claim 14, wherein the axle differential gear has a locking function.

20. The drive axle according to claim 19, wherein a locking function of the differential gear is shiftable by a shift element so that the differential cage and an output axle are intercouplable.

21. The drive axle according to claim 12, wherein the constant transmission ratio is designed as a stationary transmission.

22. The drive axle according to claim 21, wherein the stationary transmission has an input shaft and an output shaft and the input shaft and the output shaft are arranged axially offset with respect to one another.

23. The drive axle according to claim 22, wherein the stationary transmission has a carrier which has planetary gears, a sun gear and a ring gear, and the carrier is immobilized, and an input is effected via one of the planetary gears and an output is effected via the ring gear.

24. The drive axle according to claim 21, wherein the stationary transmission comprises an input gear, two intermediate gears and an output gear, and the two intermediate gears mesh with both the input gear and the output gear.

25. The drive axle according to claim 13, wherein the electric machines comprise rotors arranged coaxially with the output shafts or carrier shafts or the axle shafts.

26. The drive axle according to claim 25, wherein at least one of the first and the second planetary gearsets, the axle differential gear and the shift elements are one of arranged at least partially within and coaxially with the rotors.

27. A drive axle of an electrically drivable vehicle, the drive axle comprising:
first and second electric machines, and each of the first and the second electric machines having a drive shaft,
first and second drive wheels,
first and second gearboxes,
the first electrical machine driving the first drive wheel, via the first gearbox, and the second electrical machine driving the second drive wheel, via the second gearbox, and the first and the second gearboxes being designed as three-speed transmissions having identical transmission ratios; and
the first and the second gearboxes each have a planetary gearset, and a sun shaft of each of the planetary gearsets being immobilized, and the first and the second gearboxes each have a shift device having at least first and second shift positions.

\* \* \* \* \*